United States Patent
Upadhye

(10) Patent No.: US 10,877,943 B1
(45) Date of Patent: Dec. 29, 2020

(54) SYSTEM AND METHOD OF NEAR-CONSTANT TIME RECOVERY OF CONTINUOUSLY CHANGING SYNTHESIZED LARGE DATASETS

(71) Applicant: Veritas Technologies LLC, Mountain View, CA (US)

(72) Inventor: Mandar Upadhye, Pune (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 963 days.

(21) Appl. No.: 14/980,993

(22) Filed: Dec. 28, 2015

(51) Int. Cl.
| | |
|---|---|
| G06F 16/00 | (2019.01) |
| G06F 16/18 | (2019.01) |
| G06F 11/14 | (2006.01) |
| G06F 16/174 | (2019.01) |
| G06F 16/27 | (2019.01) |
| G06F 40/197 | (2020.01) |

(52) U.S. Cl.
CPC ...... *G06F 16/1873* (2019.01); *G06F 11/1451* (2013.01); *G06F 16/1756* (2019.01); *G06F 16/27* (2019.01); *G06F 40/197* (2020.01)

(58) Field of Classification Search
CPC ......... G06F 17/30309; G06F 17/30575; G06F 17/30988; G06F 8/71; G06F 16/283; G06F 16/24556; G06F 16/24539; G06F 16/957; G06F 16/2264; G06F 16/873; G06F 16/219; G06F 16/2329; G06F 16/2474; G06F 16/27; G06F 16/1873; G06F 16/23; G06F 16/1756; G06F 40/197
See application file for complete search history.

(56) References Cited

U.S. PATENT DOCUMENTS

| | | | | |
|---|---|---|---|---|
| 6,317,752 B1* | 11/2001 | Lee | ...................... | G06F 16/284 |
| | | | | 707/748 |
| 6,381,536 B1* | 4/2002 | Satoh | ..................... | G08G 1/09 |
| | | | | 340/995.1 |
| 6,449,622 B1* | 9/2002 | LaRue | ............. | G06F 17/30575 |
| 6,542,894 B1* | 4/2003 | Lee | ..................... | G06F 16/2465 |
| 6,714,925 B1* | 3/2004 | Barnhill | .............. | G06K 9/6228 |
| | | | | 706/48 |
| 6,871,295 B2* | 3/2005 | Ulrich | .................. | G06F 9/5083 |
| | | | | 714/6.12 |

(Continued)

FOREIGN PATENT DOCUMENTS

WO    WO2011028715 A1 *  3/2011

*Primary Examiner* — Srirama Channavajjala
(74) *Attorney, Agent, or Firm* — Patent Law Works LLP

(57) ABSTRACT

A system and method for data recovery of large datasets is provided. The method may include generating a first version of a dataset having a plurality of segments. The first version may be generated by collecting a plurality of data inputs from a plurality of computing devices and storing these in a map. The method may further include generating a first delta map corresponding to changes in the plurality of segments for a second version of the dataset, wherein the second version is one of a plurality of versions of the dataset generated after the first version. In addition, the method may include generating a second delta map corresponding to changes in the plurality of segments for all versions prior to the second version. Further, the method may include generating a recovered version of the dataset by summing the first version, the first delta map, and the second delta map.

17 Claims, 7 Drawing Sheets

(56) References Cited

U.S. PATENT DOCUMENTS

| | | | | |
|---|---|---|---|---|
| 6,959,369 B1* | 10/2005 | Ashton | | G06F 11/1469 |
| | | | | 711/162 |
| 7,320,009 B1* | 1/2008 | Srivastava | | G06F 16/1844 |
| | | | | 707/625 |
| 7,420,847 B2* | 9/2008 | Li | | G11C 11/5628 |
| | | | | 365/185.09 |
| 7,761,456 B1* | 7/2010 | Cram | | G06F 11/1435 |
| | | | | 707/754 |
| 8,412,719 B1* | 4/2013 | Nandy | | G06F 16/248 |
| | | | | 707/754 |
| 8,949,395 B2* | 2/2015 | Atluri | | G06F 11/1453 |
| | | | | 709/202 |
| 9,098,326 B1* | 8/2015 | Martin | | G06F 9/4881 |
| 9,171,054 B1* | 10/2015 | Ward | | G06F 16/2246 |
| 2006/0161598 A1* | 7/2006 | Barrs | | G06F 16/219 |
| 2008/0091742 A1* | 4/2008 | Marshall | | G06F 16/29 |
| 2009/0024813 A1* | 1/2009 | Uysal | | G06F 11/1471 |
| | | | | 711/162 |
| 2010/0082580 A1* | 4/2010 | DeFrang | | G06F 40/197 |
| | | | | 707/706 |
| 2010/0260259 A1* | 10/2010 | Kimmich | | H04N 21/631 |
| | | | | 375/240.07 |
| 2011/0055250 A1* | 3/2011 | Nandy | | G06F 16/248 |
| | | | | 707/769 |
| 2011/0145315 A1* | 6/2011 | Walker | | G06F 16/972 |
| | | | | 709/203 |
| 2011/0246816 A1* | 10/2011 | Hsieh | | H04L 67/1042 |
| | | | | 714/4.12 |
| 2012/0290542 A1* | 11/2012 | Trotta | | G06F 16/2365 |
| | | | | 707/687 |
| 2012/0330979 A1* | 12/2012 | Elson | | G06F 17/30988 |
| | | | | 707/752 |
| 2013/0205183 A1* | 8/2013 | Fillingim | | G06F 11/1044 |
| | | | | 714/773 |
| 2013/0246560 A1* | 9/2013 | Feng | | H04L 29/0809 |
| | | | | 709/217 |

* cited by examiner

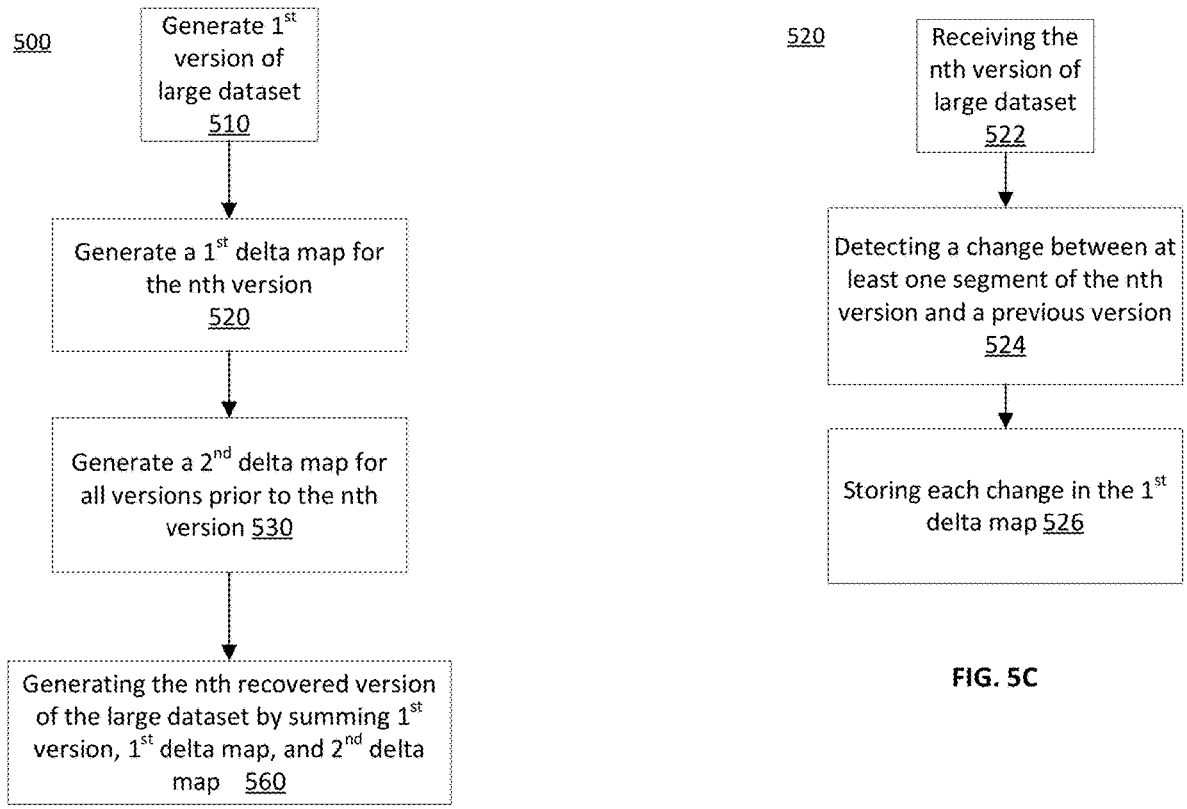
FIG. 5A
FIG. 5C
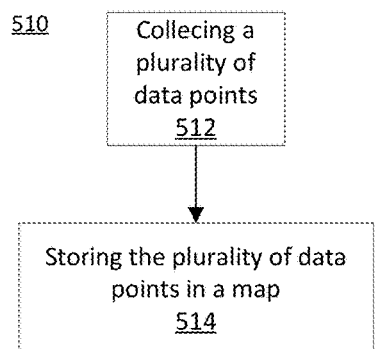
FIG. 5B

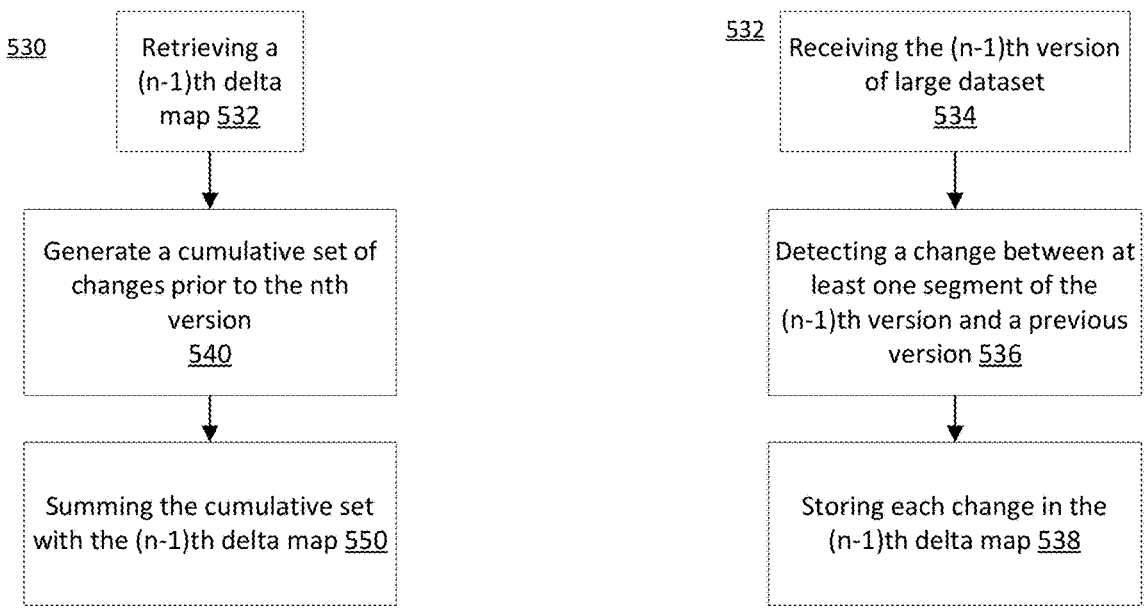
FIG. 5D
FIG. 5E
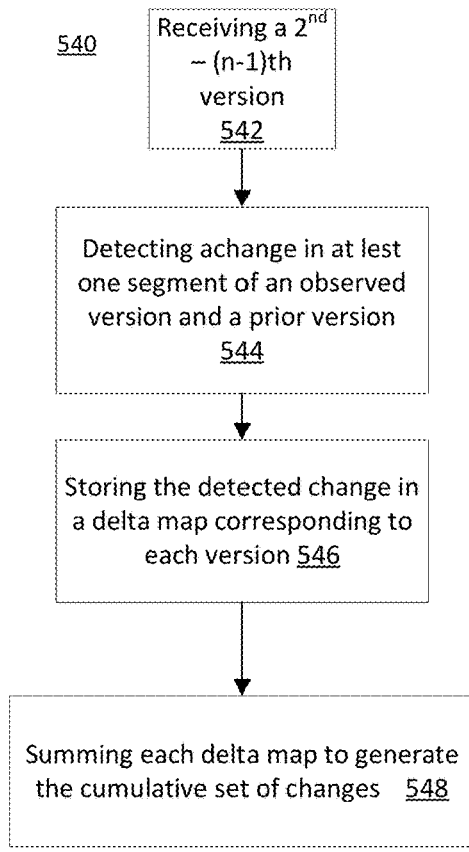
FIG. 5F

SYSTEM AND METHOD OF NEAR-CONSTANT TIME RECOVERY OF CONTINUOUSLY CHANGING SYNTHESIZED LARGE DATASETS

BACKGROUND

Synthesized Large Data Sets (SLDS) represent large to very large datasets that are formed by aggregating or synthesizing a large number of discreet data. Unlike other conventionally large datasets, such as large database files or virtual disk files, SLDS does not exist as a single data set in the primary, for individual datum may possess little value and meaning. Generally, the data of SLDS is synthesized within a secondary storage for various purposes such as security, archiving, research, analytics, and the like. Examples of SLDS may include data relating to weather, on-board flight monitoring systems, satellite information, oceanography, scientific/engineering research, bioinformatics, remote sensing (e.g. hyperspectral datasets), homeland defense (e.g. face recognition, epidemiology) large-scale physics simulations, dynamics on complex networks (e.g. internet traffic analysis, urban population dynamics), and the like. A particular example of SLDS may comprise a nationwide weather dataset that is collected from millions of sensors. Thereby, it is only by the aggregation of millions of data points into a SLDS (such as, a snapshot of national weather for example) that any meaningful application of a dataset can be performed for further research, analysis, modelling and the like.

The challenge for systems processing SLDS evolves around the characteristics of SLDS. First, SLDS constantly changes in size and shape. In particular, some data points of the SLDS may not be available for a certain amount of time. For example, a few sensors may malfunction or may not be able to transmit data due to bad weather. Further, at any point in time data points or sensors may be added to the system, further altering the dataset. Moreover, since SLDS typically changes rapidly, numerous versions of a dataset may exist within a given time frame. However, no conventional techniques like snapshots can be employed for efficient capture and restore of different versions of SLDS. Thus, with a large number of versions to be maintained for each dataset, the recovery time also increases as a function of the number of versions maintained. Further, SLDS recovery consumes an unreasonably large amount of storage space.

One present system (manufactured by Veeam® Software) uses reverse incrementals, where the last backup is a full backup and all previous incremental backups are converted into reverse incrementals. The goal of reverse incrementals is to move forward the retention window, such that the old full backup may be deleted. However, this solution always requires that a full backup be maintained for recovery. In another data recovery system, Oracle's® RMAN, the last incremental backup is merged, when a new incremental backup is created. Yet, RMAN always merges the new incremental with the full backup to create a new full backup. Thus, there is only the last full backup and exactly one last incremental backup available for data recovery. Other data recovery systems like Apache Hadoop include distributed processing of very large data sets on computer clusters. These systems, however, yield longer response times and sub-optimal storage layout. Thus, there is a need to efficiently capture, store, and recover data (including metadata) relating to SLDS, such that any given version of SLDS can be efficiently recovered without consuming a lot of time. It is within this context that the embodiments arise.

SUMMARY

In some embodiments, a system and a method for data recovery of large datasets is provided. The method for data recovery may include generating a first version of a dataset having a plurality of segments. For example, the first version may be generated by collecting using a processor a plurality of data inputs corresponding to the first version of the large dataset from a plurality of computing devices and storing these in a map. The method may further include generating a first delta map corresponding to changes in the plurality of segments for a second version of the large dataset, wherein the second version is one of a plurality of versions of the dataset generated after the first version. In addition, the method may include generating a second delta map corresponding to changes in the plurality of segments for all versions prior to the second version. Further, the method may include generating a recovered version of the data set by summing the first version, the first delta map, and the second delta map.

In some embodiments, data recovery system is provided. The data recovery system may include a memory coupled to a processor operable to generate a first version of a large dataset having a plurality of segments. The processor may be further operable to generate a first delta map corresponding to changes in the plurality of segments for a second version of the large dataset, wherein the second version is one of a plurality of versions of the dataset generated after the first version. In addition, the processor may be further operable to generate a second delta map corresponding to changes in the plurality of segments for all versions prior to the second version. Further, the processor may be operable to generate a recovered version of the dataset by summing the first version, the first delta map, and the second delta map.

In some embodiments, a tangible, non-transitory, computer-readable media having instructions whereupon which, when executed by a processor, cause the processor to perform the router hijacking detection method described herein. The method may include generating a first version of a large dataset having a plurality of segments. For example, the first version may be generated by collecting using a processor a plurality of data inputs corresponding to the first version of the large dataset from a plurality of computing devices and storing these in a map. The method may further include generating a first delta map corresponding to changes in the plurality of segments for a second version of the large dataset, wherein the second version is one of a plurality of versions of the dataset generated after the first version. In addition, the method may include generating a second delta map corresponding to changes in the plurality of segments for all versions prior to the second version. Further, the method may include generating a recovered version of the dataset by summing the first version, the first delta map, and the second delta map.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIG. 5A is an exemplary flow diagram of a method of data recovery for large datasets in accordance with some embodiments.

FIG. 5B is a flow diagram for the method for generating the initial version of the large dataset of FIG. 5A.

FIG. 5C is a flow diagram for a method of generating the first delta map for the nth version FIG. 5A.

FIG. 5D is a flow diagram for a method of generating the second delta map for all versions prior to the nth version of FIG. 5A.

FIG. 5E is a flow diagram for a method of retrieving the delta map corresponding to the $(n-1)^{th}$ version of FIG. 5A.

FIG. 5F is a flow diagram for a method of generating a cumulative set of changes prior to the $n^{th}$ version of FIG. 5A.

DETAILED DESCRIPTION

Figure 1:
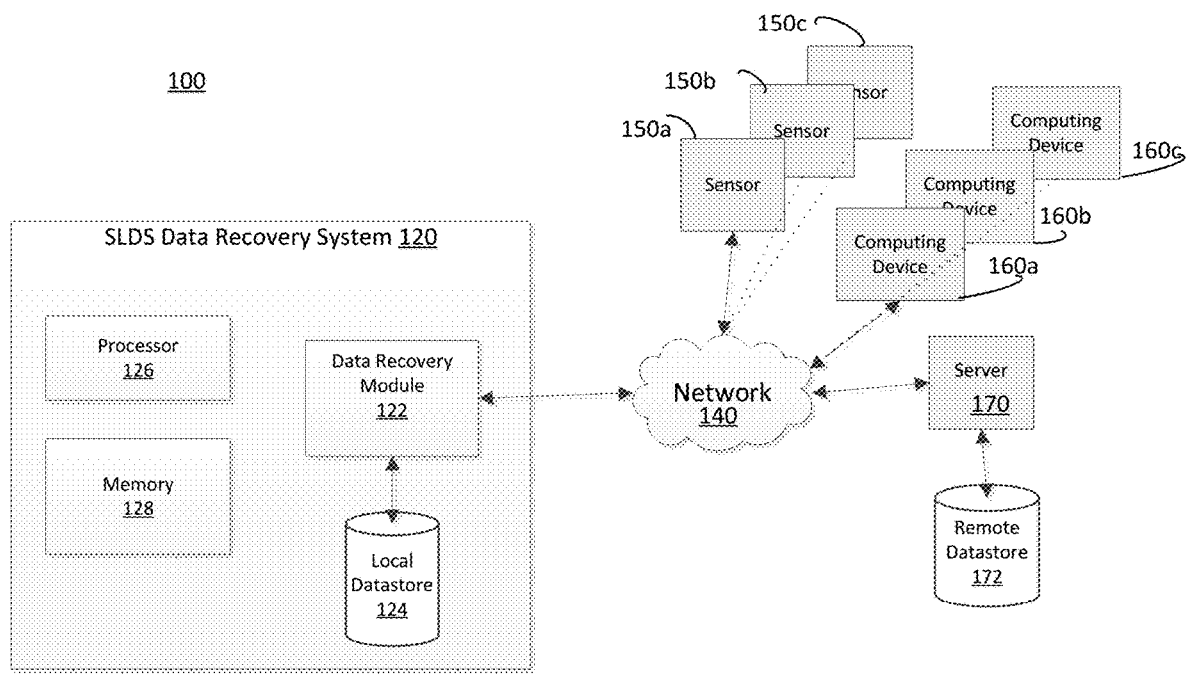
FIG. 1 is a block diagram of an exemplary network architecture for data recovery of large datasets, in accordance with some embodiments.

The embodiments below describe a system and a method for near-constant time recovery of continuously changing synthesized large data sets. The method may include generating a first version of a dataset having a plurality of segments. For example, the first version may be generated by collecting using a processor a plurality of data inputs corresponding to the first version of the large dataset from a plurality of computing devices and storing these in a map. The method may further include generating a first delta map corresponding to changes in the plurality of segments for a second version of the large dataset, wherein the second version is one of a plurality of versions of the dataset generated after the first version. In addition, the method may include generating a second delta map corresponding to changes in the plurality of segments for all versions prior to the second version. Further, the method may include generating a recovered version of the data set by summing the first version, the first delta map, and the second delta map.

The system and method for data recovery described herein enables recovery of any version of a continuously changing synthesized large data set (SLDS) with almost near-constant time of recovery. The method may further include storing metadata, such that the time required to recover any given copy of data is significantly reduced. Moreover, not only is the time to recover the large dataset greatly reduced, but it also becomes near-constant irrespective of the version recovered. This system and method for data recovery also possesses better performance over existing methods. Further, the system described herein is space-efficient and does not require costly hardware. This system and method applies to all emerging markets of SLDS and can be equally applied to most of the traditional workloads.

The system and method for data recovery described herein behaves differently from RMAN in two ways. First, the method merges an incremental with previous incremental and not with the last Full. Secondly, the method described herein maintains multiple versions of such merged incremental backups and, not just the last one. With respect to reverse incrementals, the system and method described herein maintains all incrementals as regular, forward incrementals. No conversion of any sort occurs for past versions. Thereby, there is no requirement to move the retention window.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates a block diagram of an exemplary network architecture 100 for data recovery of SLDS in which embodiments of the SLDS data recovery system 120 may operate. The network architecture 100 may include one or more SLDS data recovery systems 120 coupled to a network 140 (e.g., public network such as the Internet or private network such as a Local Area Network (LAN)). Network 150 may comprise a mobile communication network (not shown) that couples to a public network, wherein the mobile communication network includes a radio access network having at least one base station. Further, the network architecture 100 may include one or more computing devices 160a-160c coupled to network 140 for providing data points associated with a SLDS. Examples of a computing device 140 may include, but are not limited to, personal computers, laptops, PDAs, mobile phones, network appliances, and the like. Additionally, the network architecture 100 may include one or more sensors 150a-150c coupled to network 140 for providing data points associated with a SLDS. The sensors 150a-150c, computing devices 160a-160c, and the SLDS data recover system 120 may reside on the same LAN, or on different LANs that may be coupled together through the Internet, but separated by firewalls, routers, and/or other network devices. In one embodiment, sensors 150a-150c may coupled to network 140 through a mobile communication network. In another embodiment, the computing systems may reside on different networks. Although not shown, in various embodiments, the computing devices may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least one of the preceding devices, and the like. In various embodiments, the sensors may be thermocouple, a thermometer, a biological sensor, an optical sensor, a chemical sensor, a microsensor, a pressure sensor, a ultrasonic sensor, humidity sensor, gas sensor, motion sensor, an acceleration sensor, a displacement sensor, and the like. Sensors 150a-150c may couple to sense acoustics, sound, vibration, automotive/navigation variables, chemicals, electrical current, electric potential, magnetic force, radio frequency, flow, fluid velocity, position, angle, displacement, distance, speed, acceleration, optics, pressure, force, density, heat, temperature, and the like.

The SLDS data recovery system 120 may comprise a processor 126, memory 128, and a data recovery module 122. The data recovery module 122 may comprise processing software instructions and/or hardware logic required for recovering a select version of the SLDS. The SLDS data recovery system 120 may also include a local data store 124, which can be one or more centralized data repositories that store datapoints, versions, delta maps (maps corresponding to changes from one version to another), and the like. The local data store 124 may represent a single or multiple data structures (databases, repositories, files, etc.) residing on one or more mass storage devices, such as magnetic or optical storage based disks, tapes or hard drives. Although data store 124 is illustrated as being local to the SLDS data recovery system 120, the network architecture 100 may include a remote data store 172, which couples through a server 170. The SLDS data recovery system 120 can communicate with the remote data store 172 over a public or private network.

The data recovery module 122 may detect changes in the datapoints associated with a version of the SLDS in accordance with an SLDS model in some embodiments. The SLDS model corresponds to a dataset that may be logically divided into segments, which are constantly updated. Likened unto a disk or a file, these segments could be equivalent to blocks or extents. That is, give a dataset D, the dataset may be divided into m segments (S1, S2, S3, . . . Sm). The segments may be all of the same size or of different sizes. The SLDS may comprise an initial full set, "Full" or F, which consists of initial value of all the segments; wherein, the full set, F, comprises $\{S1_0, S2_0, S3_0, Sm_0\}$. Any value of the full set F may be a null value. Incremental updates for the dataset may comprise a set $(I_1, I_2, I_3, \ldots I_n)$, in such that within each update, various segments are updated.

Prior data recovery systems may store all the incremental changes (deltas) in a chronological manner, and thereafter recover any given version of the dataset by applying all the preceding incremental changes in chronological order. This approach to recovery of any random version of the dataset, however, has an efficiency that is a function of the number of incrementals. That is, the time for recovery of a version of a dataset increases with the number of incrementals processed. In particular, since any version $V_n$ of the dataset equals the sum of all the incremental updates over the base version (i.e. $V_n = F + I_1 + I_2 + I_3 + \ldots + I_n$), the conventional approach may be time consuming.

Figure 2:
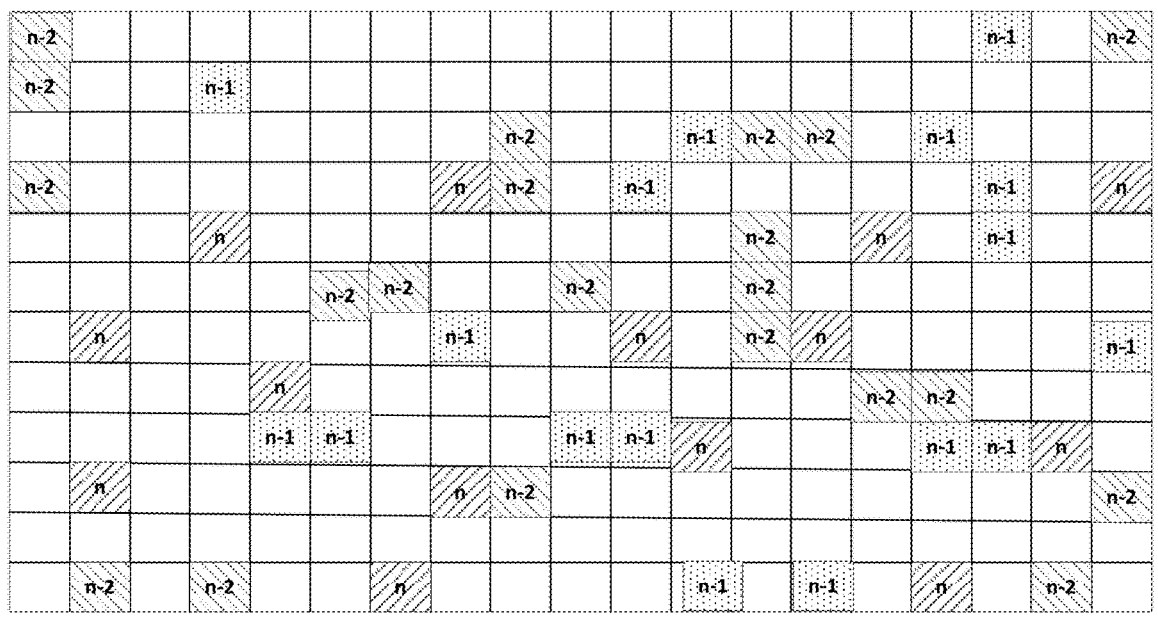
FIG. 2 is a block diagram of a map for a large dataset having incremental updates in some embodiments.
Figure 2:
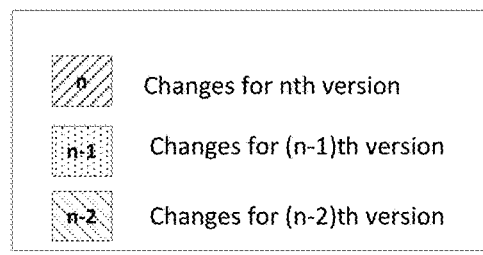

In contrast, the SLDS model corresponding to the system and method described herein differs to the above approach for data recovery of a version $V_n$ in the following manner. FIG. 2 is a block diagram of a map 200 for a large dataset having incremental updates in some embodiments. That is, for any given version of the dataset as shown in FIG. 2, any particular segment may change. As illustrated, each block represents a segment, wherein a changed segment is indicated by shading and a representative version notation (i.e. n, n–1, n–2, etc.). In particular, as shown in FIG. 2, the segments (blocks) marked 'n' are the segments changed in the $n^{th}$ update. Similarly, segments marked 'n–1' are the segments changed in the $(n-1)^{th}$ update. A dataset D represents a collection of all the individual segments (i.e. D={$S_0$, $S_1$, $S_2$, . . . , $S_m$}). As different updates change these segments $S_0$-$S_m$, any given version $V_n$ of the dataset D is a union of all the segments changed over different versions. Therefore, the $n^{th}$ version $V_n$ of the dataset D can be approximately represented as:

$$V_n = \{\text{set of segments changed in version } n\} + \{\text{set of segments changed in version } n-1\} + \{\text{set of segments changed in version } n-2\} + + \text{Base version} \quad [1]$$

Figure 3:
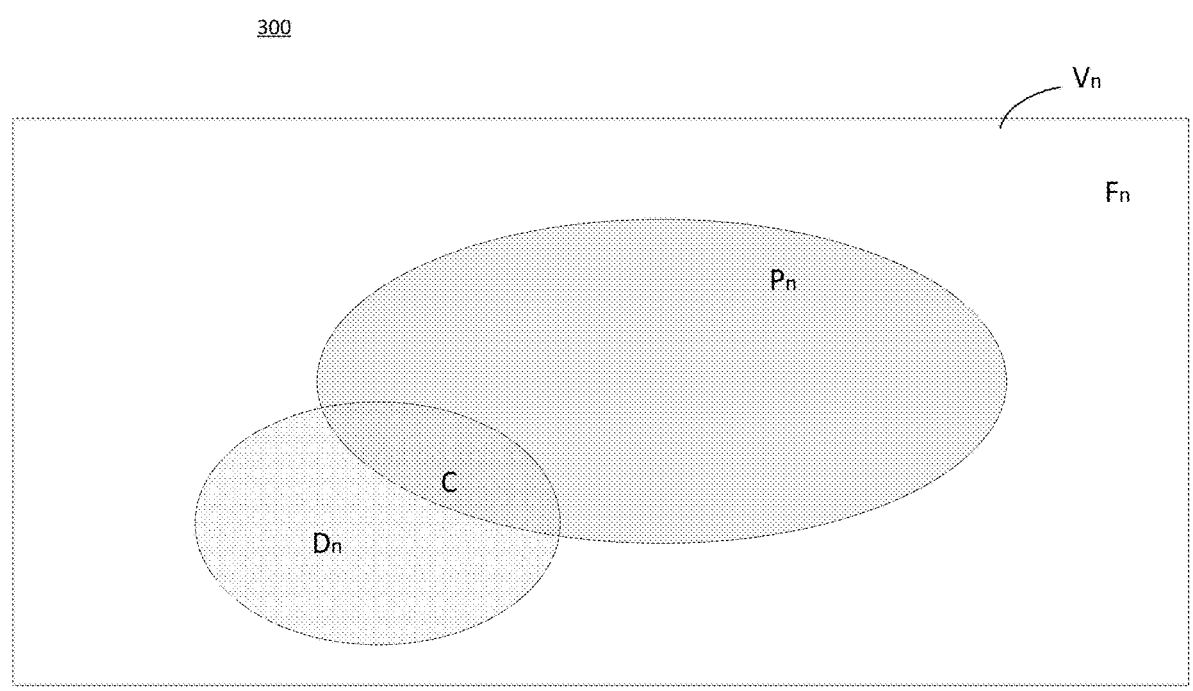
FIG. 3 is a Venn diagram representing an example for a mathematical model of dataset versions in accordance with some embodiments.

There, however, may exist segments that change over multiple versions. That is, for example, a segment $S_1$ may change in the $n^{th}$ and $(n-1)^{th}$ versions, but not in the $(n-2)^{th}$ version. In any case, the system and method ensures that the latest version of the segment needs to take precedence over older versions. Thus, the more accurate representation of the $n^{th}$ version of the dataset D can be represented mathematically as in FIG. 3 using a Venn diagram. As noted supra, FIG. 3 is a Venn diagram representing an example for a mathematical model of dataset versions in accordance with some embodiments. As shown, any particular $n^{th}$ version $V_n$ may be represented by the set of segments that did not change in any of the n updates ($F_n$). Further, the $n^{th}$ version may comprise a set of segments that changed in the $n^{th}$ update ($D_n$) and a set of segments that changed in all the updates prior to the $n^{th}$ update ($P_n$). Finally, the $n^{th}$ version ($V_n$) may further include a set of segments (C) common to both the $n^{th}$ update and any previous updates. As shown, this is illustrated as the datapoints in the area where the elliptical region for $P_n$ intersects the elliptical region for $D_n$. This region is the intersection of $P_n$ and $D_n$, denoted by $P_n \cap D_n$. The combined set of segments representing all changes is the union of regions $P_n$ and $D_n$, denoted by $P_n \cup D_n$. It may be noted that the set C may or may not be a null set.

As shown in FIG. 3, the $n^{th}$ version $V_n$ of the Dataset D can be represented mathematically as:

$$V_n = D_n + \{P_n - C\} + F_n \quad [2]$$

All segments that are only changed in updates prior to the $n^{th}$ version can be expressed as:

$$\{P_n - C\} = \{(D_n \cup P_n) \cap D_n\} \quad [3]$$

Therefore, all segments unchanged in any of the n updates may be represented by the mathematical expression:

$$F_n = \{(D_n \cup P_n) \cap F\} \quad [4]$$

Thus, the $n^{th}$ version may be represented by the following equation:

$$V_n = D_n + \{(D_n \cup P_n) \cap D_n\} + \{(D_n \cup P_n) \cap F\} \quad [5]$$

Notably, the absolute value of the $n^{th}$ version $V_n$ is qual to the absolute value of the full initial set, $F: |V_n| = |F|$; but $V_n \neq F$. That is, the cardinality (number of elements in a set) of $V_n$ and F can be the same, but the sets may not be equal. They can be equal if there are no updates to the dataset. In other words, $V_n = F$, when $D_n = P_n = 0$ (representing empty sets). Thus, the equation [5] can be written in a more concise form as:

$$V_n = D_n + P_n \backslash D_n\} + \{F \backslash (D_n \cup P_n)\} \quad [6]$$

where, $P_n \backslash D_n$ is equal to the set difference of $P_n$ and $D_n$. That is, $P_n \backslash D_n$ is equal to all members (segments) of $P_n$ that are not part of $D_n$.

Further, equation [6] is in the form that requires only three entities in many cases to correctly express any given version of the dataset. These three entities are: F, where F equals the initial full set of all segments; Dn, where D equals the change (delta) corresponding to the $n^{th}$ version; and Pn, where Pn equals the change (delta) corresponding to all versions prior to the $n^{th}$ version.

Another implication of equation [6] is that two of the three entities involved are constant. In particular, the initial full set of all segments, F, is always constant for a given system. Further, the change (delta), $D_n$, corresponding to the $n^{th}$ version may also be constant in magnitude (i.e. the amount of changed segments per update/version) for a given system. The only parameter that may slightly vary is the change (delta), $P_n$, corresponding to all versions prior to the $n^{th}$ version. This delta parameter, $P_n$, may grow over time, due to successive versions typically having only a partial overlap with previous versions. Therefore, two of the parameters remain constant, while the third varies and grows slightly over the time. Thereby, the recovery time of any version using this system modeled after equation [6] is near-constant.

Figure 4:
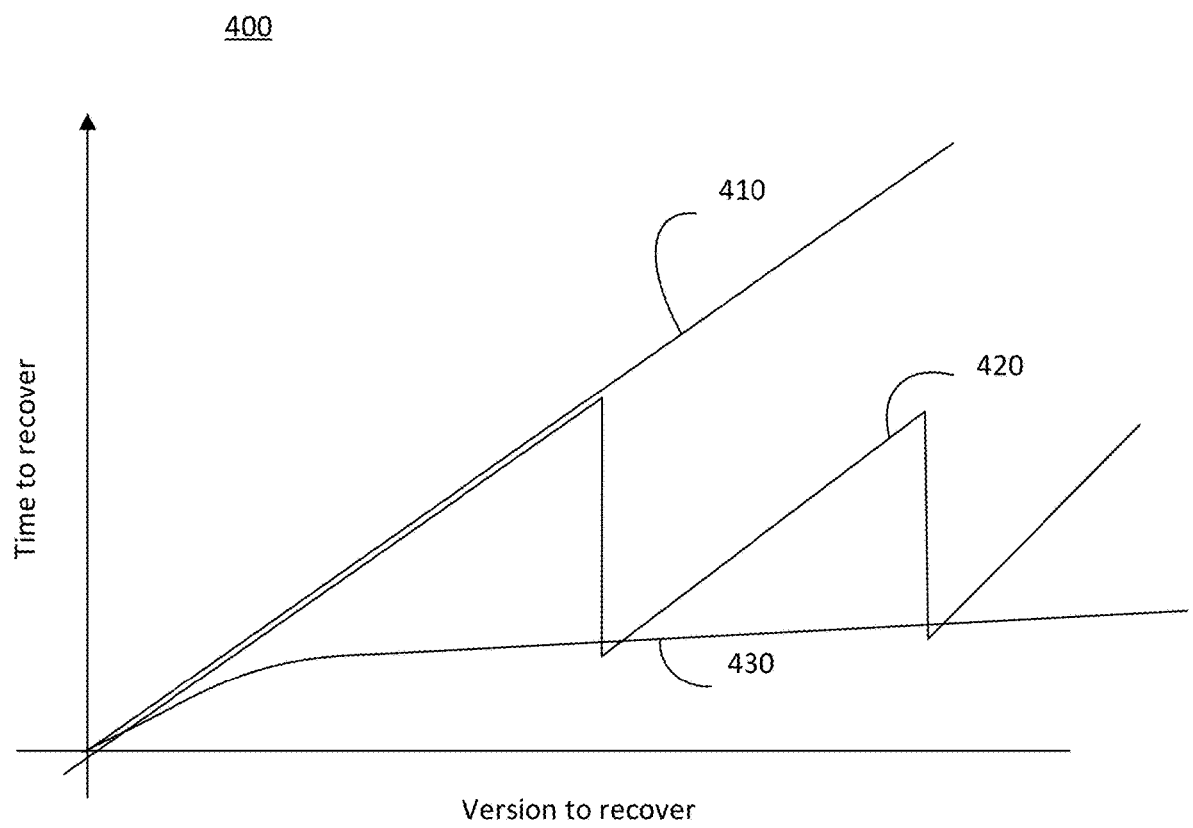
FIG. 4 is a graphical representation showing the recovery performance of the system in accordance with some embodiments versus other methods.

FIG. 4 is a graphical representation showing the recovery performance of the system in accordance with some embodiments versus other methods. That is, the characterization of the recovery time as described above can be explained with the help of FIG. 4, which shows a graphical representation of projected recovery performance of the system and method described herein versus the recovery time of prior technique(s). As shown, the time to recover a dataset in curve 410 for a conventional method of applying n incrementals to a full backup is a function of the number of versions. Thereby, the larger the number of incremental updates, the longer the conventional method may take to recover a particular version of the dataset. The time to recover a dataset represented by curve 420 for another conventional method, where a recovered version is optimized with an intermediate synthetic full, renders the recovery time to be a function of the versions to recover within a designated time scale or range. Conversely, the recovery time curve 430 for the time to recover a dataset using the system and method disclosed herein is the shortest and does not depend upon the number of existing versions. The recovery time curve 430 is the least amount of time required for data recovery of the three methods presented. It should be noted that any system of capturing and recovering a dataset may, at all times, maintain the full set of all segments F and all instances of the change corresponding to the $n^{th}$ version, $D_n$. However, the delta parameter $P_n$ is the only entity that is not directly maintained in a conventional system. Any system, however, that can correctly maintain $P_n$ for all required versions can use the SLDS model proposed herein, where equation [6] may be used to quickly recover any version of the dataset in near-constant time.

Therefore, the system and method for data recovery described herein enables recovery of any version of a continuously changing synthesized large data set (SLDS) with almost near-constant time of recovery. Further, the time to recover the large dataset also becomes near-constant irrespective of the version recovered. This system and method for data recovery also possesses better performance over existing methods. Further, the system described herein is space-efficient and does not require costly hardware. This system also applies to all emerging markets of SLDS and can be equally applied to most of the traditional workloads.

The foregoing description illustrates how the "extents map" for the particular version that can be recovered. Regarding the data, the system can use one of the techniques, such as the FUSE mapper driver. Further, scalable storage can be used to create virtual objects above the storage capacity layer, which merely has pointers to the actual chunks of data in the underlying storage layer. Thus, there need not be any physical movement of data for recovery.

FIG. 5A is an exemplary flow diagram of a method of data recovery for large datasets in accordance with some embodiments. In an action 510, the SLDS data recovery system 120 may generate a first version of a large dataset. For example, as shown in FIG. 5B, which represents a flow diagram for the method for generating the initial version of the large dataset of FIG. 5A, SLDS data recovery system 120 may collect a plurality of data points from sensors (150a-150c) or computing devices (160a-160c). These sensors or computing devices may be coupled locally or remotely to a data recovery module 122 located with the SLDS data recovery system 120. These datapoint samples may be stored locally or remotely into a map representing the initial full set of all segments (F).

Following equation [6] as noted supra, the recovered version equals the sum of the initial full set of all segments (F); the change (delta) corresponding to the $n^{th}$ version ($D_n$); and the change (delta) corresponding to all versions prior to the $n^{th}$ version ($P_n$). Accordingly, in an action 520, the SLDS data recovery system 120 may generate a first delta map for the $n^{th}$ version of the dataset. In particular, FIG. 5C represents a flow diagram for a method of generating the first delta map for the $n^{th}$ version FIG. 5A (action 520). As shown, in action 522, the data recovery module 122 couples to receive the $n^{th}$ version of the large dataset. The data recovery module 122, at action 524, detects a change between at least one segment of the $n^{th}$ version and a previous version. For example, where the SLDS data recovery systems 120 couples to receive data relating to weather from a vast number of sensors over a network, the data recovery module detects a change between the $n^{th}$ version and the $(n-1)^{th}$ version. Further, the data recovery module 122, at action 526, may store each change in the first delta map.

In an action 530, the SLDS data recovery system 120 may generate a second delta map for all versions prior to the $n^{th}$ version of the dataset. For example using the weather example noted supra, the data recovery module generates a delta map for all versions prior to the $n^{th}$ version of the dataset. In particular, FIG. 5D represents a flow diagram for a method of generating the second delta map for all versions prior to the $n^{th}$ version of FIG. 5A (action 530). As shown in action 532, the data recovery module 122 retrieves the $(n-1)^{th}$ delta map from storage. In particular, FIG. 5E is a flow diagram for a method of retrieving the delta map corresponding to the $(n-1)^{th}$ version of FIG. 5A (action 532). Action 532 begins with the data recovery module 122 receiving the $(n-1)^{th}$ version for the large dataset at action 534. In an action 536, the data recovery module 122 detects a change between at least one segment of the $(n-1)^{th}$ version and a previous version. Further, the data recovery module 122 at action 538 stores each detected change in a second delta map corresponding to the $(n-1)^{th}$ version.

Further, the data recovery module 122, at action 540 of FIG. 5D may generate a cumulative set of changes prior to the $n^{th}$ version. In particular, FIG. 5F is a flow diagram for a method of generating a cumulative set of changes prior to the $n^{th}$ version of FIG. 5A (action 540). Action 540 begins with the data recovery module 122 receiving all prior versions from the second version through to the $(n-1)^{th}$ version at action 542. Reviewing each version separately from the second version through to the $(n-1)^{th}$ version, the data recovery module 122, at action 544, may detect a change in at least one segment of an observed version and a prior version. Further, the data recover module 122, at action 546 may store each detected change in a respective delta map corresponding to each version from the second version through to the $(n-1)^{th}$ version. In an action 548, the data recovery module 122 may sum each respective delta map to generate the cumulative set of changes. To complete the generation of the second delta map of action 530 that uses the cumulative set of changes (referring back to FIG. 5D), the data recovery module 122 may also sum the cumulative set with the $(n-1)^{th}$ delta map at action 550.

As a final step in FIG. 5A in an action 560, the SLDS data recovery system 120 may generate a recovered dataset for the nth version by summing the initial full set of all segments generated in action 510, the first delta map generated in action 520, and the second delta map generated in action 530. Thereby, the method for data recovery described herein enables recovery of any version of a continuously changing synthesized large data set (SLDS) with almost near-constant time of recovery. The method may further include storing metadata, such that the time required to recover any given copy of data is significantly reduced. Moreover, not only is the time to recover the large dataset greatly reduced, but it also becomes near-constant irrespective of the version recovered. This method for data recovery also possesses better performance over existing methods. Further, this method applies to all emerging markets of SLDS and can be equally applied to most of the traditional workloads.

Figure 6:
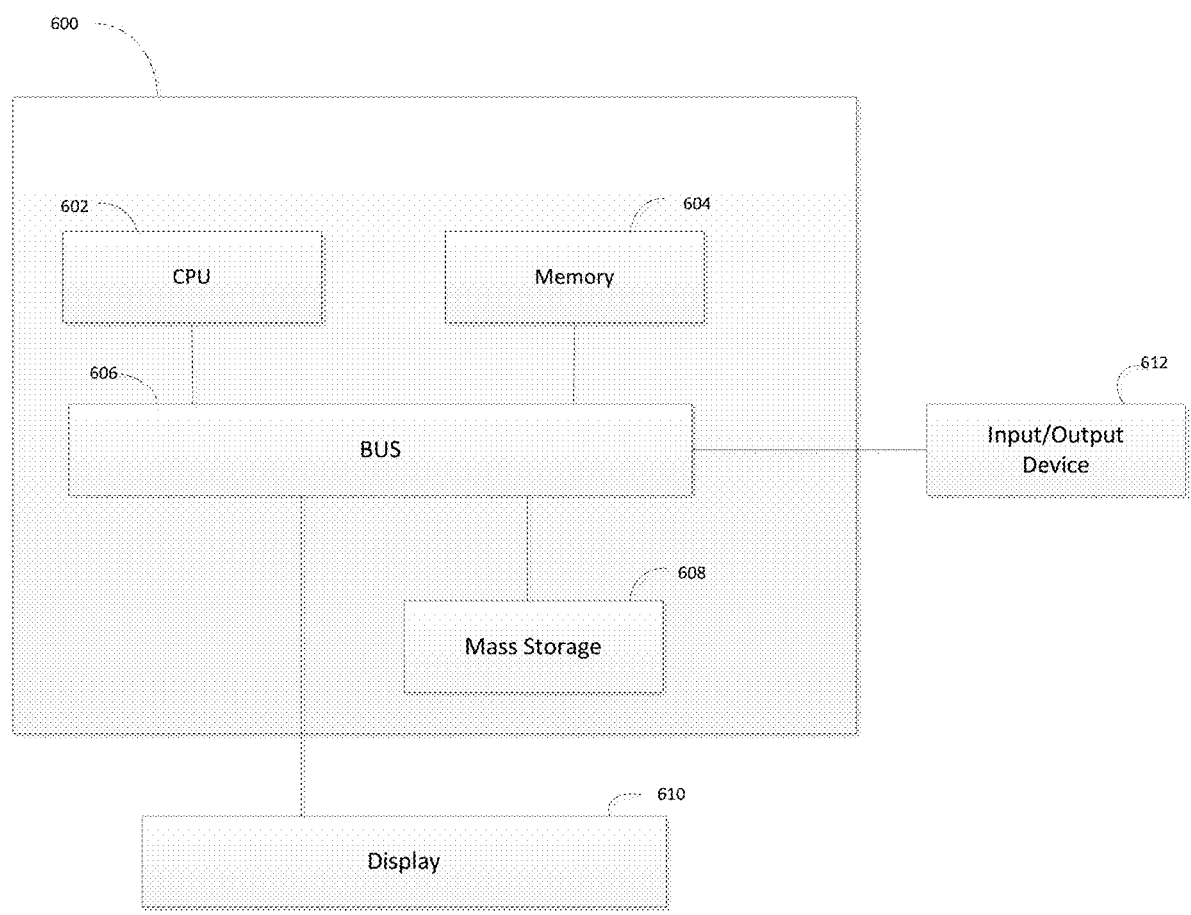
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for performing the data recovery of large datasets in accordance with some embodiments. The computing device includes a central processing unit (CPU) 602, which is coupled through a bus 606 to a memory 604, and mass storage device 608. Mass storage device 608 represents a persistent data storage device such as a floppy disc drive or a fixed disc drive, which may be local or remote in some embodiments. The mass storage device 608 could implement a backup storage, in some embodiments. Memory 604 may include read only memory, random access memory, etc. Applications resident on the computing device may be stored on or accessed through a computer readable medium such as memory 604 or mass storage device 608 in some embodiments. Applications may also be in the form of modulated electronic signals modulated accessed through a network modem or other network interface of the computing device. It should be appreciated that CPU 602 may be embodied in a general-purpose processor, a special purpose processor, or a specially programmed logic device in some embodiments.

Display 612 is in communication with CPU 602, memory 604, and mass storage device 608, through bus 606. Display 612 is configured to display any visualization tools or reports associated with the system described herein. Input/output device 610 is coupled to bus 606 in order to communicate information in command selections to CPU 602. It should be appreciated that data to and from external devices may be communicated through the input/output device 610. CPU 602 can be defined to execute the functionality described herein to enable the functionality described with reference to FIGS. 1-5. The code embodying this functionality may be stored within memory 604 or mass storage device 608 for execution by a processor such as CPU 602 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of data recovery for a Synthesized Large Data Set (SLDS) dataset logically divided into segments that are continuously changeable, comprising:

storing, by a processor, a map representing an initial full set of segments of the SLDS;

collecting, by the processor, a plurality of data inputs corresponding to a plurality of versions, at different times, of the SLDS dataset from a plurality of computing devices, with each version having a plurality of segments in which individual segments are updatable such that any individual segment is capable of being changed over a previous version;

generating a first version of the SLDS dataset having a plurality of segments corresponding to the initial full set of segments;

generating a first delta map corresponding to changes in the plurality of segments for a second version of the SLDS dataset, wherein the second version is one of a plurality of versions of the SLDS dataset generated after the first version;

generating a second delta map corresponding to changes in the plurality of segments for all versions prior to the second version wherein the generating of the second delta map includes retrieving a delta map corresponding to a previous version, generating a cumulative set of changes prior to the second version of the SLDS dataset, and summing the cumulative set of changes with the delta map corresponding to the previous version to generate the second delta map; and generating a recovered version of the SLDS dataset by summing the first version, the first delta map and the second delta map;

wherein the initial full set of segments is constant for a particular SLDS system, the first delta map has a size constant in magnitude for an amount of changed segments per update for the particular SLDS system, and the second delta map has a variable size;

wherein the recovered version of the SLDS dataset is generated with near-constant time recovery.

2. The method of claim 1, wherein the generating of the first version of a SLDS dataset comprising:

collecting, by the processor, a plurality of data inputs corresponding to the first version of the SLDS dataset from the plurality of computing devices; and storing the plurality of data inputs in a map.

3. The method of claim 1, wherein the generating of the first delta map comprising:

receiving the second version of the SLDS dataset;

detecting a change between at least one segment of the second version of the SLDS dataset and a corresponding at least one segment of a prior version of the SLDS dataset; and storing each change in the first delta map corresponding to the second version of the SLDS dataset.

4. The method of claim 1, wherein the retrieving a delta map corresponding to the previous version comprising:

receiving a previous version of the SLDS dataset;

detecting a change between at least one segment of the previous version of the SLDS dataset and a corresponding at least one segment of a prior version of the SLDS dataset; and storing each change in the delta map corresponding to the previous version of the SLDS dataset.

5. The method of claim 1, wherein the generating a cumulative set of changes comprising:

receiving each version between the first version through the previous version of the SLDS dataset as an observed version;

detecting, for each version, a detected change between at least one segment of the observed version of the SLDS dataset and a corresponding at least one segment of a prior version of the SLDS dataset; and storing, for each version, the detected change in a delta map corresponding to each version of the SLDS dataset.

summing each delta map to generate the cumulative set of changes.

6. The method of claim 1, wherein the SLDS dataset comprises data relating to weather, bioinformatics, hyperspectral remote sensing, face recognition, epidemiology, large-scale physics simulations, internet traffic analysis, or urban population dynamics.

7. A data recovery system for a Synthesized Large Data Set (SLDS) dataset logically divided into segments that are continuously changeable, comprising:

a memory; and a processor operable to:

store, by a processor, a map representing an initial full set of segments of the SLDS;

collect a plurality of data inputs corresponding to a plurality of versions, at different times, of the SLDS dataset from a plurality of computing devices, with each version having a plurality of segments in which individual segments are updatable such that any individual segment is capable of being changed over a previous version;

generate a first version of a SLDS dataset having a plurality of segments corresponding to the initial full set of segments;

generate a first delta map corresponding to changes in the plurality of segments for a second version of the SLDS dataset, wherein the second version is one of a plurality of versions of the SLDS dataset generated after the first version;

generate a second delta map corresponding to changes in the plurality of segments for all versions of the SLDS dataset prior to the second version of the SLDS dataset, wherein the generate the second delta map includes retrieving a delta map corresponding to the previous version of the SLDS dataset, generating a cumulative set of changes prior to the second version of the SLDS dataset, and summing the cumulative set of changes with the delta map corresponding to the previous version to generate the second delta map; and generate a recovered version of the SLDS dataset by summing the first version, the first delta map and the second delta map;

wherein the initial full set of segments is constant for a particular SLDS system, the first delta map has a size constant in magnitude for an amount of changed segments per update for the particular SLDS system, and the second delta parameter has a variable size;

wherein the recovered version of the SLDS dataset is generated with near-constant time recovery.

8. The data recovery system of claim 7, wherein the generate the first version of the SLDS data includes:
   collecting, by the processor, a plurality of data inputs corresponding to the first version of a SLDS dataset from a plurality of computing devices; and
   storing the plurality of data inputs in a map.

9. The data recovery system of claim 7, wherein the generate the first delta map includes to:
   receiving the second version of the SLDS dataset;
   detecting a change between at least one segment of the second version of the SLDS dataset and a corresponding at least one segment of a prior version of the SLDS dataset; and
   storing each change in the first delta map corresponding to the second version of the SLDS dataset.

10. The data recovery system of claim 7, wherein retrieving the delta map corresponding the previous version includes:
    receiving a previous version of the SLDS dataset;
    detecting a change between at least one segment of the previous version of the SLDS dataset and a corresponding at least one segment of a prior version of the SLDS dataset; and
    storing each change in the delta map corresponding to the previous version of the SLDS dataset.

11. The data recovery system of claim 7, wherein generating the cumulative set of changes:
    receiving each version between the first version through the previous version of the dataset as an observed version;
    detecting, for each version, a change between at least one segment of the observed version of the SLDS dataset and a corresponding at least one segment of a prior version of the SLDS dataset; and
    storing, for each version, the detected change in a delta map corresponding to each version of the SLDS dataset;
    summing each delta map to generate the cumulative set of changes.

12. The data recovery system of claim 7, wherein the SLDS dataset comprises data relating to weather, bioinformatics, hyperspectral remote sensing, face recognition, epidemiology, large-scale physics simulations, internet traffic analysis, or urban population dynamics.

13. A non-transitory computer-readable medium including code for performing a method of data recovery for a Synthesized Large Data Set (SLDS) dataset logically divided into segments that are continuously changeable, the method comprising:
    storing, by a processor, a map representing an initial full set of segments of the SLDS;
    collecting a plurality of data inputs corresponding to a plurality of versions, at different times, of the SLDS dataset from a plurality of computing devices, with each version having a plurality of segments in which individual segments are updatable such that any individual segment is capable of being changed over a previous version;
    generating a first version of a SLDS dataset having a plurality of segments corresponding to the initial full set of segments;
    generating a first delta map corresponding to changes in the plurality of segments for a second version of the SLDS dataset, wherein the second version is one of a plurality of versions of the SLDS dataset generated after the first version;
    generating a second delta map corresponding to changes in the plurality of segments for all versions prior to the second version wherein the generating of the second delta map includes retrieving a delta map corresponding to the previous version of the SLDS dataset, generating a cumulative set of changes prior to the second version of the SLDS dataset, and summing the cumulative set of changes with the delta map corresponding to the previous version to generate the second delta map; and
    generating a recovered version of the SLDS dataset by summing the first version, the first delta map and the second delta map;
    wherein the initial full set of segments is constant for a particular SLDS system, the first delta map has a size constant in magnitude for an amount of changed segments per update for the particular SLDS system, and the second delta parameter has a variable size;
    wherein the recovered version of the SLDS dataset is generated with near-constant time recovery.

14. The non-transitory computer-readable medium of claim 13, wherein the generating the first version of a SLDS dataset comprising:
    collecting, by the processor, a plurality of data inputs corresponding to the first version of a SLDS dataset from a plurality of computing devices; and
    storing the plurality of data inputs in a map.

15. The non-transitory computer-readable medium of claim 13, wherein the generating of the first delta map comprising:
    receiving the second version of the SLDS dataset;
    detecting a change between at least one segment of the second version of the SLDS dataset and a corresponding at least one segment of a prior version of the SLDS dataset; and
    storing each change in the first delta map corresponding to the second version of the SLDS dataset.

16. The non-transitory computer-readable medium of claim 13, wherein the retrieving a delta map corresponding the previous version comprising:
    receiving a previous version of the SLDS dataset;
    detecting a change between at least one segment of the previous version of the SLDS dataset and a corresponding at least one segment of a prior version of the SLDS dataset; and
    storing each change in the delta map corresponding to the previous version of the SLDS dataset.

17. The non-transitory computer-readable medium of claim 13, wherein the generating a cumulative set of changes comprising:
    receiving each version between the first version through the previous version of the SLDS dataset as an observed version;
    detecting, for each version, a detected change between at least one segment of the observed version of the SLDS dataset and a corresponding at least one segment of a prior version of the SLDS dataset; and
    storing, for each version, the detected change in a delta map corresponding to each version of the SLDS dataset.

* * * * *